Sept. 22, 1964 R. W. VAN SAUN 3,150,322
RECEIVER SIGNAL LOCKING APPARATUS USING TRIGGER CIRCUIT IN CONTROL LOOP
Filed Aug. 20, 1962
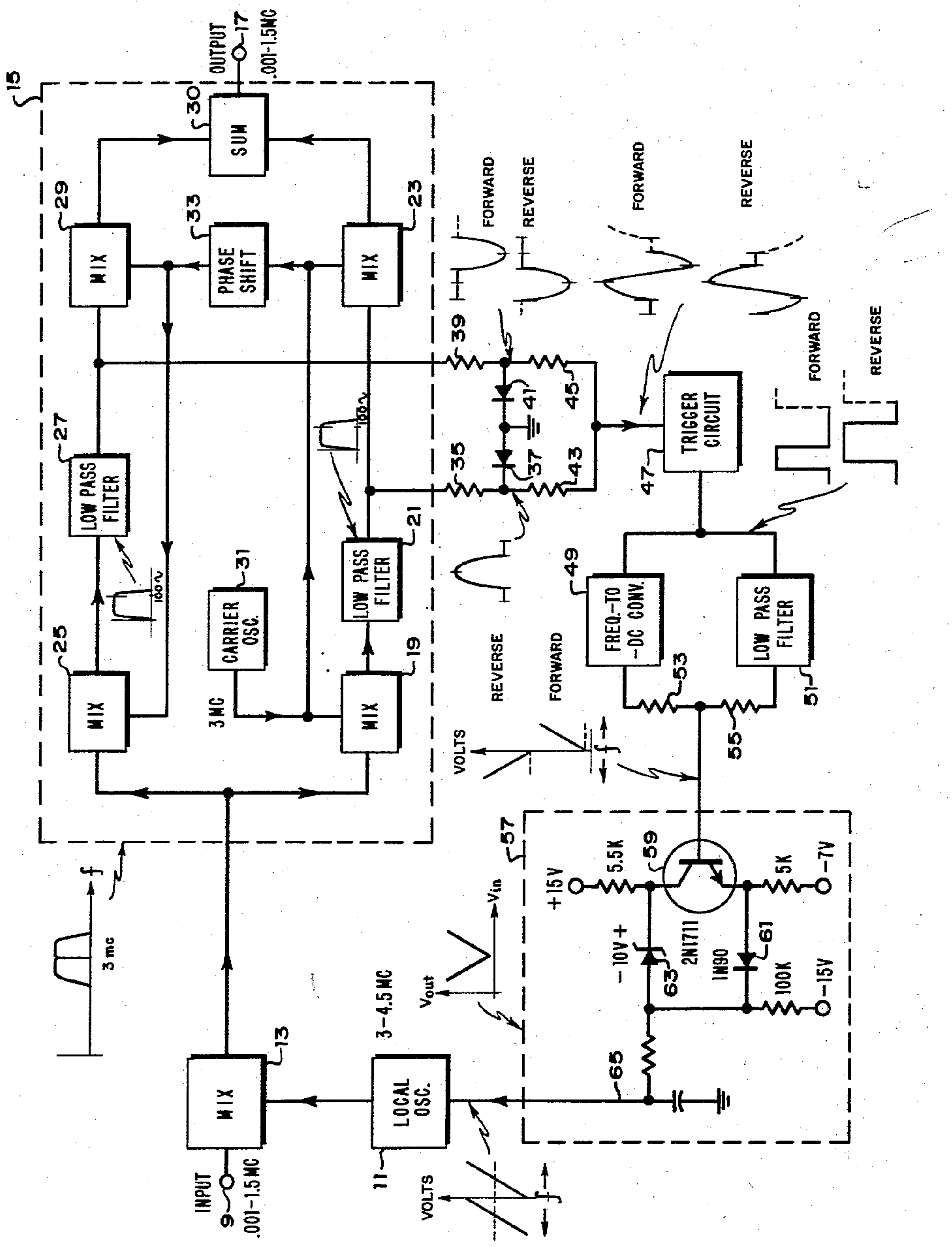
INVENTOR
RICHARD W. VAN SAUN
BY [signature]
ATTORNEY United States Patent Office 3,150,322

Patented Sept. 22, 1964

3,150,322

RECEIVER SIGNAL LOCKING APPARATUS USING TRIGGER CIRCUIT IN CONTROL LOOP

Richard W. Van Saun, Mountain View, Calif., assignor to Hewlett-Packard Company, Palo Alto, Calif., a corporation of California Filed Aug. 20, 1962, Ser. No. 217,874

5 Claims. (Cl. 325—420)

This invention relates to the method and means for automatically locking a signal at selected positions within the passband of a frequency-selective system.

Frequencies about a selected sideband in a modulation system may readily be extracted by using a tuned filter or other narrow passband device. Where extremely high selectivity is required about a high frequency sideband, it is known to provide a low pass filter to pass the difference frequency of an applied frequency and a carrier frequency and to mix this difference frequency again with the carrier frequency. This has the effect of shifting the actual and image frequency characteristics of the low pass filter in frequency by the value of the carrier frequency. Undesirable sidebands created by mixing the difference frequency again with the carrier frequency may be cancelled using another similar channel operating on the same applied and carrier frequencies, one of which is shifted in phase angle by 90°. Frequency selective devices of this type are described in the literature (see "A Third Method of Generation and Detection of Single Sideband Signals," Donald K. Weaver, Proceedings of the IRE, vol 44, No. 12, December 1956, pages 1703–1705).

Where this scheme is used for selectivity in applications requiring a capacitor to block the thermal drift voltages produced by the modulators, a null appears in the frequency characteristic of the system at the carrier frequency. An automatic frequency control circuit operating on this type of passband characteristic may lock onto the null and thereby cause a resulting decrease in signal transmission. It is thus desirable in a frequency selective system of this type to provide an automatic frequency control circuit which locks the desired signal within the passband at selected positions on either side of the null in frequency characteristics.

Accordingly, it is a principal object of the present invention to provide a signal locking circuit which is capable of locking a signal within the passband at either side of the null in the frequency characteristic of a frequency selective system.

In accordance with a preferred embodiment of the present invention two signals are produced which have a frequency equal to the difference between the frequency of an applied signal and a carrier frequency. These signals are derived from the frequency selective circuit and are separated by a relative phase angle of 90°. If the frequency of the applied signal is larger than the carrier frequency, one of the signals leads the other signal in quadrature. If the frequency of the applied signal is less than the carrier frequency, the one signal lags the other signal in quadrature. These signals are used to control the repetition rate and duty cycle of pulses produced by a trigger circuit. The pulses are applied to a circuit which produces a steady voltage proportional to the repetition rate of the pulses and to a circuit which produces a steady voltage proportional to the duty cycle of the pulses. The combination of these steady voltages is applied to an inverting circuit which provides in-phase amplification of signals having an amplitude above a critical value and which provides out-of-phase amplification of signals having an amplitude below the critical value. The output voltage of the inverting circuit is then used to control the frequency of a signal which is mixed with an input signal to produce the signal applied to the frequency selective circuit.

Other and incidental objects of the present invention will be apparent from a reading of this specification and an inspection of the accompanying drawing which shows a schematic diagram of the signal locking apparatus of the present invention.

Referring to the drawing, signal appearing at input terminal 9 and the signal from local oscillator 11 are mixed together in mixer 13. The output of mixer 13 is applied to the selective filter designated generally as 15 which constitutes a selective network that typically may provide a passband of 200 cycles bandwidth about a carrier frequency of 3 megacycles. A first channel of the selective filter 15 connecting the output of mixer 13 and output terminal 17 includes serially connected mixer 19, low pass filter 21 and balanced mixer 23. A second channel of the selective filter includes serially connected mixer 25, low pass filter 27 and balanced mixer 29. The carrier oscillator 31 is connected to the mixers 19 and 23 of the first channel and is connected through phase shift network 33 to the mixers 25 and 29 of the second channel. A first rectifying network including resistor 35 and diode 37 is connected to receive the output of low pass filter 21. A second rectifying circuit including resistor 39 and diode 41 is connected to receive the output of low pass filter 27. The outputs of the rectifying circuits are combined using resistors 43 and 45 and are applied to the input of trigger circuit 47. Pulses produced by the trigger circuit 47 are applied to the frequency-to-D.C. converter 49 and to the low pass filter 51. The outputs of the converter 49 and filter 51 are combined using resistors 53 and 55 and are applied to the inverting circuit 57. The inverting circuit 57 includes transistor 59 having its base electrode connected to receive applied signal. Serially connected diode 61 and Zener diode 63 connect the collector and emitter electrodes of the transistor. The output of the inverting circuit is derived from the common connection of the diodes.

In operation, a signal under examination appearing at input terminal 9 is mixed with the frequency of local oscillator 11 in mixer 13. The output of mixer 13 is applied to the frequency-selective single-sideband filter 15 which provides an extremely narrow passband around the frequency of carrier oscillator 31. Where the low pass filters 21 and 27 of the filter 15 are capacitively coupled to block D.C. from the mixers 19 and 25, a null appears in the center of the passband characteristic of filter 15 about the frequency of carrier oscillator 31. It is essential to lock a signal within this passband on either side of the null by varying the frequency of local oscillator 11. To this end the rectifying circuit including diodes 37 and 41, trigger circuit 47, low pass filter 51, the frequency-to-D.C. converter circuit 49, and the inverting circuit 57 are provided to produce a signal which locks the signal on either side of the null in the passband of the single sideband filter 15. The signal at the output of mixer 13 which has a frequency of approximately three megacycles for any frequency applied to the input terminal 9 within the indicated range, is applied to the inputs of mixers 19 and 25. The signal is mixed with the frequency of carrier oscillator 31 in mixer 19 of the first channel and is mixed with the same frequency shifted 90 degrees by phase shift network 33 in mixer 25 of the second channel. The resulting difference signals having the same frequency are applied to the low pass filters 21 and 27 in each of the channels. These filters are designed to cut off sharply at a low audio frequency, say 100 cycles, and are designed to have zero transmission at D.C. The difference signal appearing at the output of low pass filter 21 is rectified by the network including diode 37 and resistor 35. The difference signal appearing at the output of low pass filter 27 and shifted by 90 degrees relative to the signal appearing at the output of filter 21 is rectified by the circuit including diode 41 and resistor 39. The positive half-cycle of the signal from the first channel and the negative half-cycle of signal from the second channel are added in the resistive network including resistors 43 and 45 and are applied to the input of the trigger circuit 47. This trigger circuit, which may be of the type commonly known as a Schmitt trigger, initiates an output pulse as an applied signal passes in one direction through a given reference level, say zero, and terminates the output pulse as the applied signal passes in the opposite direction through a given reference level, say zero. Thus, if the frequency of the signal appearing at the output of the mixer 13 is greater than the frequency of carrier oscillator 31 the circuit operates in the "forward" condition producing the indicated waveforms. If the frequency at the output of mixer 13 is less than the frequency of carrier oscillator 31 the circuit operates in the "reverse" condition producing the indicated waveforms. It can be seen that when the circuit operates in the "reverse" condition, trigger circuit 47 produces output pulses having a greater duty cycle than the pulses produced when the circuit operates in the "forward" condition. Also, the repetition rate of the pulses produced by the trigger circuit 47 is equal to the frequency of the difference signals appearing at the outputs of filters 21 and 27. These pulses when applied to low pass filter 51 produce an output voltage which is related to the average value of the applied pulses, which average value is large in the "reverse" condition and small in the "forward" condition. At the same time, a steady voltage is produced by the frequency-to-D.C. converter 49 which is related to the repetition rate of the pulses. The combination of these two voltages provides an indication of the relationship between the frequency of the signal appearing at the output of mixer 13 and the carrier oscillator frequency. Thus for the "forward" condition, a low voltage which corresponds to a low duty cycle and which increases with difference frequency is applied to the base electrode of transistor 59. For the "reverse" condition, a higher voltage which corresponds to a high duty cycle and which increases with difference frequency is applied to the base electrode of transistor 59. The inverting circuit 57 which includes transistor 59 provides out-of-phase amplification of signals below the value of the largest voltage produced in the "forward" condition, and provides in-phase amplification of signals above the value of the lowest voltage produced in the "reverse" condition. Transistor 59 is so biased that Zener diode 63 is rendered conductive in the reverse breakdown region and diode 61 is rendered nonconductive for low voltages applied to the base electrode. The transistor thus operates as a common emitter stage and provides out-of-phase amplification of applied signals. Zener diode becomes nonconductive in the reverse voltage region and diode 61 becomes conductive when the voltage applied to the base electrode and amplified is sufficiently large to reduce the collector voltage below the Zener voltage of diode 63. Transistor 59 then operates as a common collector stage and provides in-phase amplification of applied signals. The control voltage applied to local oscillator 11 to vary its frequency thus increases from a low value as the frequency of the applied signal increases above the carrier frequency and decreases from a higher value as the frequency of the applied signal decreases below the carrier frequency. If the local oscillator 11 is designed to shift frequency in response to voltage variations about a reference potential, say ground, then the voltage applied thereto from the inverting circuit 57 causes the frequency to shift above and below the frequency established by the reference level on each side of the null in the frequency characteristic of the selective filter 15. The transmission characteristic between input terminal 9 and the output terminal 17 in one embodiment of the present invention is thus a passband 200 cycles wide about the frequency of the signal appearing at input terminal 9 and which has a null in the center of the passband that is approximately 1 cycle wide.

The apparatus of the present invention thus provides the means for locking a signal on either side of the null in the passband of a highly selective single sideband filter. This permits selected frequency components of an applied complex waveform to be isolated within the passband for independent analysis and to be tracked automatically over small ranges as the selected component drifts in frequency with time and temperature.

I claim:

1. In a single sideband selective filter system of the character described: a local oscillator; a mixer for combining a signal under examination and the signal from said oscillator; said single sideband selective filter including means generating said carrier signal and being connected to receive the output of said mixer; means to derive a pair of signals from said single sideband filter having a frequency related to the difference between the frequency of the signal at the output of said mixer and the frequency of said carrier signal, one of the signals leading the other signal for the frequency of the signal at the output of said mixer being greater than the frequency of said carrier signal, said other signal leading said one signal for the frequency of the signal at the output of said mixer being less than the frequency of said carrier signal; a trigger circuit adapted to operate only in either one of two operating states, said trigger circuit being connected to receive said signals and being adapted to produce pulses having a repetition rate related to the frequency of said signals and having a duty cycle related to each of the phase relationships between said signals; means producing a first steady voltage related to the duty cycle of said pulses; means producing a second steady voltage related to the repetition rate of said pulses; a gain inverting circuit providing in-phase amplification of applied signal between a selected level and one operating limit and providing out-of-phase amplification of applied signals between the selected level and another operating limit, said gain inverting circuit being connected to receive the combination of the first and second steady voltages; and means for so applying the signal at the output of said gain inverting circuit to said local oscillator to vary the frequency thereof as to lock the signal under examination within the passband of said single sideband selective filter.

2. In a single sideband selective filter system having a pair of channels, one receiving a carrier signal, the other receiving said carrier signal shifted in phase: a variable frequency local oscillator; a mixer for combining a signal under examination and the signal from said oscillator; said single sideband selective filter including means generating said carrier signal and being connected to receive the output of said mixer; means to derive a signal from each of said channels having a frequency equal to the difference between the frequency of the signal at the output of said mixer and the frequency of said carrier signal, the signal from one channel leading the signal from the other channel for the frequency of the signal at the output of said mixer being greater than the frequency of said carrier signal, the signal from said other channel leading the signal from said one channel for the frequency of the signal at the output of said mixer being less than the frequency of said carrier signal; means to derive half cycles of said signals of opposite polarity; a trigger circuit adapted to operate only in either one of two operating states; said trigger circuit being connected to receive the combination of said half-cycle signals and being adapted to initiate an output pulse when the combined signals pass in one direction through a reference level and being adapted to terminate said pulse when the combined signals pass in the opposite direction through a reference level; means producing a first steady voltage related to the duty cycle of said pulses; means producing a second steady voltage related to the repetition rate of said pulses; an inverting circuit providing in-phase amplification of applied signal between a selected level and one operating limit and providing out-of-phase amplification for applied signals between the selected level and another operating limit; said inverting circuit being connected to receive the combination of the first and second steady voltages; and means for applying the output of said inverting circuit to said local oscillator to vary the frequency thereof; whereby the signal under examination is locked at selected positions within the passband of said selective filter.

3. Apparatus for maintaining a signal at selected positions within the pass band of a superheterodyne system, the apparatus comprising: a variable frequency local oscillator; means for mixing a signal applied to said apparatus and the signal from said oscillator to produce a modulated signal; signal generating means producing a pair of signals having a selected phase difference; means producing a first signal as the difference between said modulated signal and one of said pair of signals; means producing a second signal as the difference between said modulated signal and the other of said pair of signals; a trigger circuit having an initial condition of stability and an actuated condition of stability and being connected to receive the combination of the first and second signals; said trigger circuit producing output pulses when triggered from one condition of stability to the other in response to said combination of signals applied to the input thereof; said output pulses having a repetition rate equal to the frequency of said signals and having a first duty cycle for the first signal leading the second signal and having a second duty cycle for the second signal leading the first signal; means producing a first steady voltage proportional to the repetition rate of said pulses, means responsive to the duty cycle of said pulses to produce a second steady voltage of one value related to said first duty cycle and of another value related to said second duty cycle; an inverting circuit providing phase inversion only of signals applied thereto having amplitudes within one operating limit and a reference level; means to apply the combination of the first and second steady voltages to said inverting circuit; and means to apply the output of said inverting circuit to said local oscillator to vary the frequency thereof, whereby the signal applied to said apparatus is locked at selected locations within the pass band of said apparatus.

4. Apparatus for maintaining a signal at selected positions within the pass band of a superheterodyne system, the apparatus comprising: a voltage controlled local oscillator; means for mixing a signal applied to said apparatus and the signal from said oscillator to produce a modulated signal; signal generating means producing a pair of signals having a selected phase difference; means producing a first signal as the difference between said modulated signal and one of said pair of signals; means producing a second signal as the difference between said modulated signal and the other of said pair of signals; a trigger circuit having an initial condition of stability and an actuated condition of stability; a rectifier circuit connected to apply to the input of said trigger circuit the combination of half cycles of one polarity of said first signal and half cycles of opposite polarity of said second signal; said trigger circuit initiating an output pulse when triggered from one condition of stability to the other in response to the combination signal applied to the input thereof passing in one direction through a reference level and terminating the output pulse when triggered from said other condition of stability to the first in response to the combination signal applied at the input thereof passing in the opposite direction through a reference level; means producing a first steady voltage proportional to the repetition rate of said pulses; means responsive to the duty cycle of said pulses to produce a second steady voltage of one value for a duty cycle greater than one-half and of another value for a duty cycle less than one-half; an inverting circuit providing phase inversion only of signals applied thereto having amplitudes within one operating limit and a reference level; means to apply the combination of the first and second steady voltages to said inverting circuit; and means to apply the output of said inverting circuit to said local oscillator.

5. A circuit responsive to the lead-lag phase relationship between a pair of signals, said circuit comprising: rectifier means producing half cycles of one polarity from one of said signals applied thereto and producing half cycles of opposite polarity from the other of said signals applied thereto; a trigger circuit adapted to operate only in either one of two operating states; means to apply the combination of said half-cycle signals to the input of said trigger circuit; said trigger circuit producing pulses when triggered from one operating state to another in response to signal applied to the input thereof, said pulses having a repetition rate related to the frequency of said pair of signals and having a duty cycle related to each of said phase relationships between said pair of signals; means to produce a first steady voltage related to the repetition rate of said pulses; means to produce a second steady voltage related to the duty cycle of said pulses; an inverting circuit providing out-of-phase amplification of signals applied thereto having an amplitude between a selected value and one operating limit and providing in-phase amplification of signals applied thereto having an amplitude between said selected value and another operating limit; and means including said inverting circuit and producing an output signal from the combination of the first and second steady voltages.

References Cited in the file of this patent

UNITED STATES PATENTS

| | | |
|---|---|---|
| 2,836,712 | Crosby | May 27, 1958 |
| 2,888,527 | Follensbee et al. | May 26, 1959 |
| 2,916,618 | Adams et al. | Dec. 8, 1959 |
| 2,924,706 | Sassler | Feb. 9, 1960 |
| 2,930,891 | Lakatos | Mar. 29, 1960 |
| 3,060,326 | Watson | Oct. 23, 1962 |
| 3,076,141 | Baumel | Jan. 29, 1963 |